Figure 1:
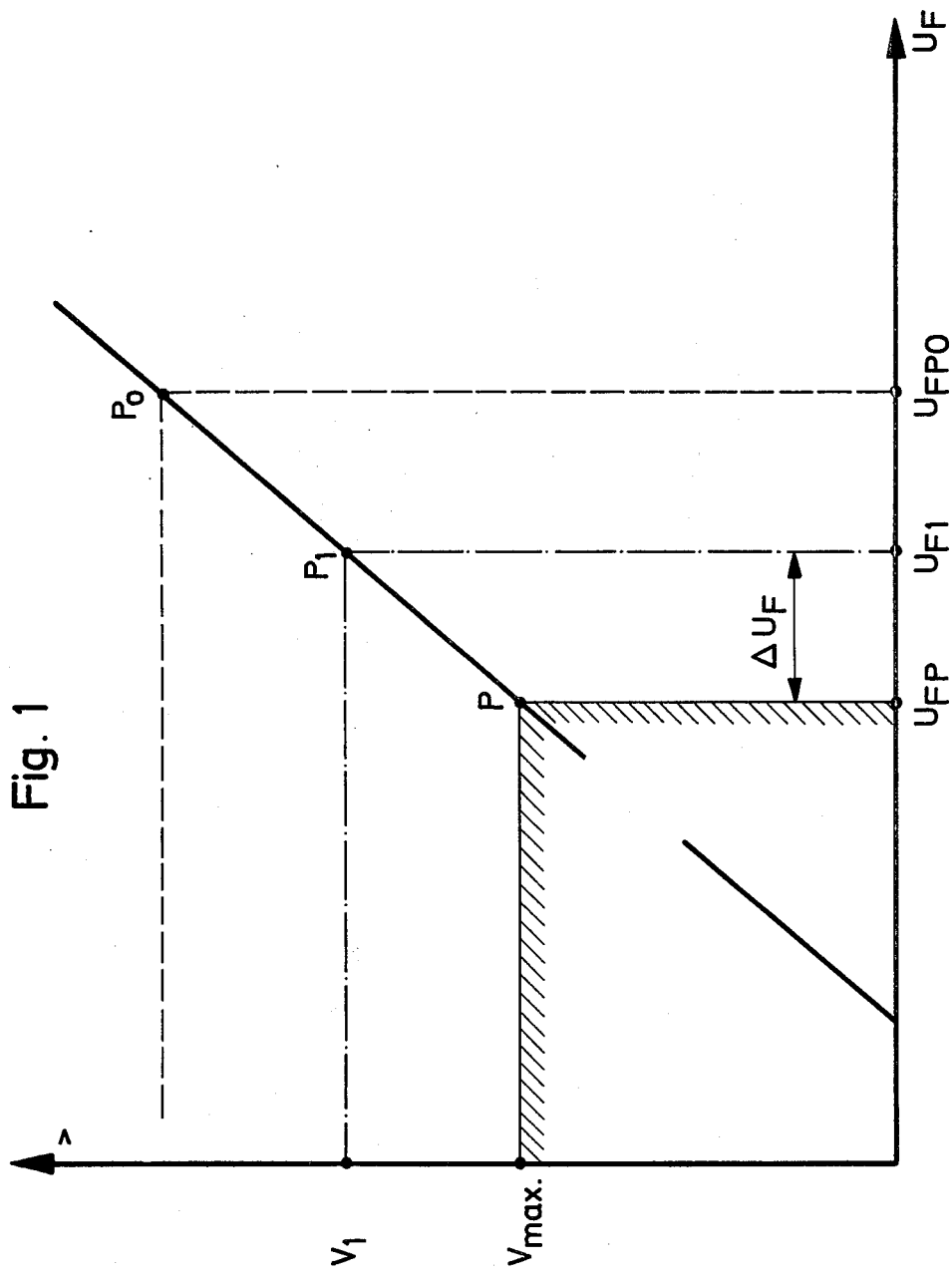

United States Patent [19]

Schröter et al.

[11] 3,998,547
[45] Dec. 21, 1976

[54] PROCESS AND APPARATUS FOR AUTOMATICALLY CHANGING THE ILLUMINATION INTENSITY OF THE LIGHT SOURCE IN A COPYING APPARATUS

[75] Inventors: Herbert Schröter; Werner Dennhardt, both of Taunusstein, Germany

[73] Assignee: Hoechst Aktiengesellschaft, Germany

[22] Filed: Aug. 5, 1975

[21] Appl. No.: 602,089

[30] Foreign Application Priority Data

Aug. 10, 1974 Germany .......................... 2438491

[52] U.S. Cl. ................................... 355/68; 355/83
[51] Int. Cl.$^2$ ........................................ G03B 27/78
[58] Field of Search ................. 355/67, 68, 69, 71, 355/83

[56] References Cited

UNITED STATES PATENTS

| | | | |
|---|---|---|---|
| 3,723,000 | 3/1973 | Sone | 355/68 X |
| 3,738,242 | 6/1973 | Lee et al. | 355/68 X |
| 3,778,154 | 12/1973 | Dennhardt et al. | 355/68 |
| 3,879,125 | 4/1975 | Schröter | 355/83 X |

FOREIGN PATENTS OR APPLICATIONS 798,738   7/1958   United Kingdom .................. 355/83

*Primary Examiner*—Joseph F. Peters, Jr.
*Attorney, Agent, or Firm*—James E. Bryan

[57] ABSTRACT

This invention relates to a process for automatically changing the illumination intensity of a light source in a copying apparatus in which the transparency of the original is measured with at least one light-sensitive measuring unit and in which, based on the measured transparency, a signal is passed on from this measuring unit for controlling the speed of a drive motor, comprising comparing the signal coming from the light-sensitive measuring unit and passed on for controlling the speed of the drive motor with a predetermined signal corresponding to the highest speed of the drive motor and, if the measured signal requires a higher speed than that of the predetermined signal, the difference of the two signals is formed and the illumination intensity is controlled in correspondence with this difference signal. The invention also relates to an apparatus for performing the process.

6 Claims, 4 Drawing Figures

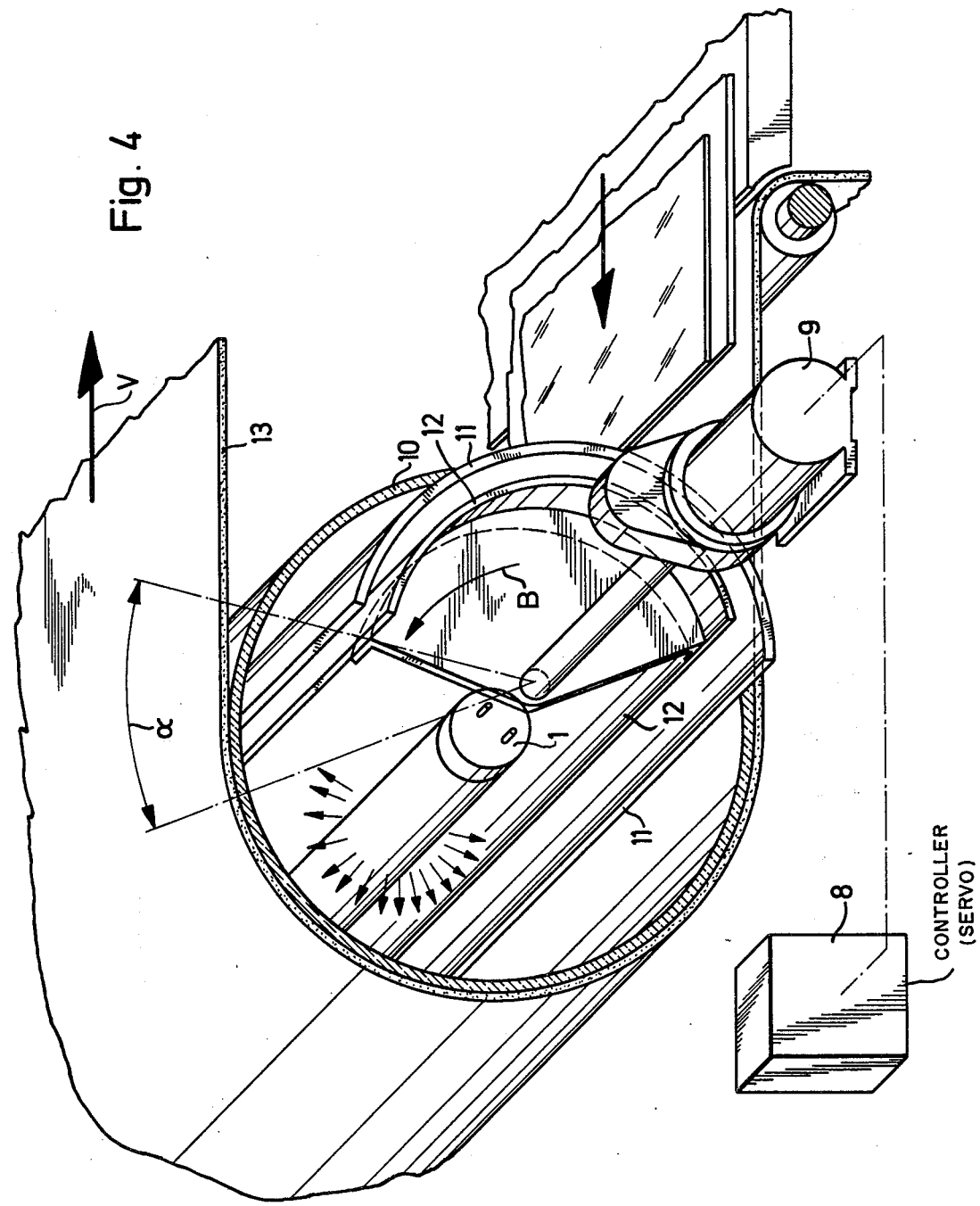

PROCESS AND APPARATUS FOR AUTOMATICALLY CHANGING THE ILLUMINATION INTENSITY OF THE LIGHT SOURCE IN A COPYING APPARATUS

The present invention relates to a process and an apparatus for automatically changing the illumination intensity in a copying apparatus in which the transparency of the original is measured with at least one light-sensitive measuring unit and in which, based on the measured transparency, a signal is passed on from this measuring unit for controlling the speed of a drive motor.

Numerous copying apparatuses are known having an automatic control of the speed of travel of the original and the copying material in dependence upon the measured transparency of the original and partially also in dependence upon the light sensitivity of the kind of copying material selected by the original (compare German Auslegeschrift No. 1,522,790, German Offenlegungsschrift No. 2,119,373, and German Offenlegungsschrift No. 2,209,725). Since the transparency of the originals used and the light sensitivity of the copying materials used vary within wide limits, it is possible in the case of originals of a high transparency, for example, to determine speeds of travel above the maximum speed of travel of the particular copying apparatus. The copying material is then too long exposed.

Copying apparatuses are also known in which the speed of travel and, furthermore, the illumination intensity can be changed, e.g. by changing the intensity of the light source or by masking larger or smaller parts of the radiation from the light source.

German Offenlegungsschrift No. 2,030,331, discloses a copying apparatus in which, with increasing transparency of the original, first the speed of travel is changed and, when the maximum speed of travel is achieved, a device for changing the illumination intensity is actuated. This is achieved with an adjusting member which can be moved by hand between an initial position and a final position for controlling exposure to light, in the first adjustment range only the speed of travel being changed and in the second adjustment range the illumination intensity being controlled at a constant maximum speed. A disadvantage of this apparatus is the inaccuracy caused by manual adjustment since the operator must estimate the transparency of the original and correspondingly actuate the adjusting member. Due to manual adjustment, it is also necessary to employ experienced operators.

It is the object of the present invention to provide a process and an apparatus with an automatic control of the speed of travel of the copying material and, when the maximum speed of travel is achieved, with an automatic control of the illumination intensity.

The present invention provides a process for automatically changing the illumination intensity in a copying apparatus in which the transparency of the original is measured with at least one light-sensitive measuring unit and in which, based on the measured transparency, a signal is passed on from this measuring unit for controlling the speed of a drive motor. The signal coming from the light-sensitive measuring unit and passed on for controlling the speed of the drive motor is compared with a predetermined signal corresponding to the highest speed of the drive motor, and, if the measured signal requires a higher speed than that of the predetermined signal, the difference of the two signals is formed and the illumination intensity is controlled in correspondence with this difference signal.

The present invention further provides an apparatus for the performance of the process which includes a. a comparator which compares the signal coming from the light-sensitive measuring unit with a predetermined input voltage corresponding to the highest speed and, if the signal requires a higher speed, supplies an output signal, b. a reference amplifier acting as a difference former to which the same predetermined input voltage is applied, which is connected with the output of the comparator and which, if the comparator supplies an output signal, supplies an output voltage itself which is proportional to the difference of the signal coming from the light-sensitive measuring unit and the predetermined input voltage, and c. a device connected to the output of the difference former for changing the illumination intensity in correspondence with the output voltage of the difference former.

By the process and the apparatus of the invention it is possible to automatically reduce the illumination intensity by the correct amount when originals of a high transparency are copied and, in correspondence with the high transparency, a signal is passed on from the light-sensitive measuring unit which requires a higher speed than the copying apparatus used can produce. Without the change of the illumination intensity, the original and the copying material would run at the maximum speed through the exposure zone and, since the transparency of the original requires a higher speed, would be overexposed.

The light-sensitive measuring unit preferably is composed of several light-sensitive elements as small as possible to increase the probability that the transparency of an uninscribed area of the original is measured. By means of a discriminator, it is possible to select that signal of the signals measured at the light-sensitive elements which corresponds to the highest light-permeability. Photoresistors, photo-electric cells, and the like may be used in known manner as light-sensitive elements.

In copying apparatus in which webs of copying material with different properties are stored and, due to the scanned properties of the original, one of the webs of copying material is selected, one light-sensitive measuring unit is sufficient when the originals are introduced always at the same guide bar of the feed table. But when the originals are introduced in correspondence with their widths at the right or left hand side guide bar of the feed table two light-sensitive measuring units are provided. The same applies to copying apparatuses in which several stacks of sheets of copying material are stored.

In addition to being passed on for controlling the speed of the driving motor, the signal measured by the light-sensitive measuring unit is passed to an input of the comparator. To a second input of the comparator, there is applied a voltage which corresponds to the maximum speed of the drive motor. The comparator emits an output signal only when the measured signal requires a higher speed than the speed corresponding to the reference voltage. When the light-sensitive measuring unit is so switched that the signal measured by it is greater with greater transparency of the original, the comparator emits an output signal only when the measured signal is above the reference voltage applied to the comparator. When the signals are identical or when the measured signal is smaller and a change of the illumination intensity is thus not necessary, the comparator emits no output signal. When, however, the light-sensitive measuring unit is so switched that the signal supplied by it is inversely proportional to the transparency of the original, a comparator is used which supplies an output signal only when the measured signal is smaller than the predetermined reference voltage.

Furthermore, the signal coming from the light-sensitive measuring unit is passed to a difference former. The signal has been amplified or the difference former contains an amplifier. A reference amplifier may be used as the difference former with simultaneous amplification. Such reference amplifiers are commercially available (see "Dioden, Z-Dioden, Gleichrichter, Thyristoren" (Diodes, Zener diodes, rectifiers, thyristors), data book 1970/71 of ITT Industries GmbH, Freiburg, Germany). To the difference former, there is also applied the voltage which corresponds to the maximum speed of travel or to the maximum speed of the drive motor. When the comparator supplies an output signal to the difference former, this difference former supplies, at its output, an output voltage which is proportional to the difference of the measured signal and the predetermined voltage.

The output voltage supplied from the difference former is passed to a device for changing the illumination intensity. This device may be a controller which applies a corresponding voltage to the light source and thus changes its intensity. The output voltage of the difference former, however, also may be given via a controller to a servomotor which adjusts a diaphragm aperture in correspondence with the voltage given to it so that larger or smaller parts of radiation from the light source are masked.

When the light of the copying light source is used for measuring the transparency of the originals and when the originals are to be copied rapidly one after the other care must be taken that, if the intensity of the copying light source is changed, the signals of the light-sensitive measuring unit for transparency measurement are corrected correspondingly. But, as mentioned above, this measure is necessary only when the transparency of the originals is measured with the light of the copying light source and when a new original is to be introduced into the copying apparatus when the preceding original is still in the exposure station. Assuming that the preceding original has such a high transparency that the original and the copying material are conveyed through the exposure station at the highest speed of travel and with a reduced intensity of the light source, then when the next original is introduced into the apparatus its transparency is measured with the light source reduced in its intensity and thus a falsified signal is passed on from the light-sensitive measuring unit for speed control. This falsified signal indicating a lower transparency can be corrected as described in the following.

A light-sensitive correcting measuring unit - like the light-sensitive measuring unit for the determination of the transparency a photoelectric cell or a photoresistor — is provided for measuring the intensity of the copying light source. It is arranged at a place in the ray path of the copying light source which is never covered by the material to be copied. The signal measured by the measuring unit is supplied to a second comparator and to a second difference former. This signal is compared in the comparator with a predetermined input voltage corresponding to the maximum intensity of the light source since, as far as exposure can be controlled alone by the change of the speed of travel, the light source emits with the maximum light intensity. When the two signals differ, the comparator supplies an output signal which is passed on to the difference former which determines the difference of the two signals and supplies an output voltage corresponding to the difference between the predetermined input voltage and the actually measured signal. This output voltage is supplied to a device which increases the signal coming from the light-sensitive measuring unit for transparency measurement in correspondence with the output voltage of the second difference former. This device may be an adder or a multiplier. This device thus always passes on a signal for speed control of the drive motor which corresponds to the transparency of the original, measured with the copying light source adjusted to maximum intensity.

The predetermined voltage corresponding to the maximum light intensity of the light source may be constant and predetermined by a voltage source or it may be adapted via a calibration unit to the particular maximum light intensity of the light source. The second possibility has the advantage that aging of the light source and the intensity change connected therewith is taken into account. The calibration unit used may be a storage, for example, which, after the switching on of the copying apparatus prior to the first copying procedure, is connected for a short time with the light-sensitive correcting measuring unit for storing the signal corresponding to the maximum light intensity of the light source. The storage then steadily supplies this signal to the second comparator and to the second difference former as a predetermined input voltage.

Figure 2:
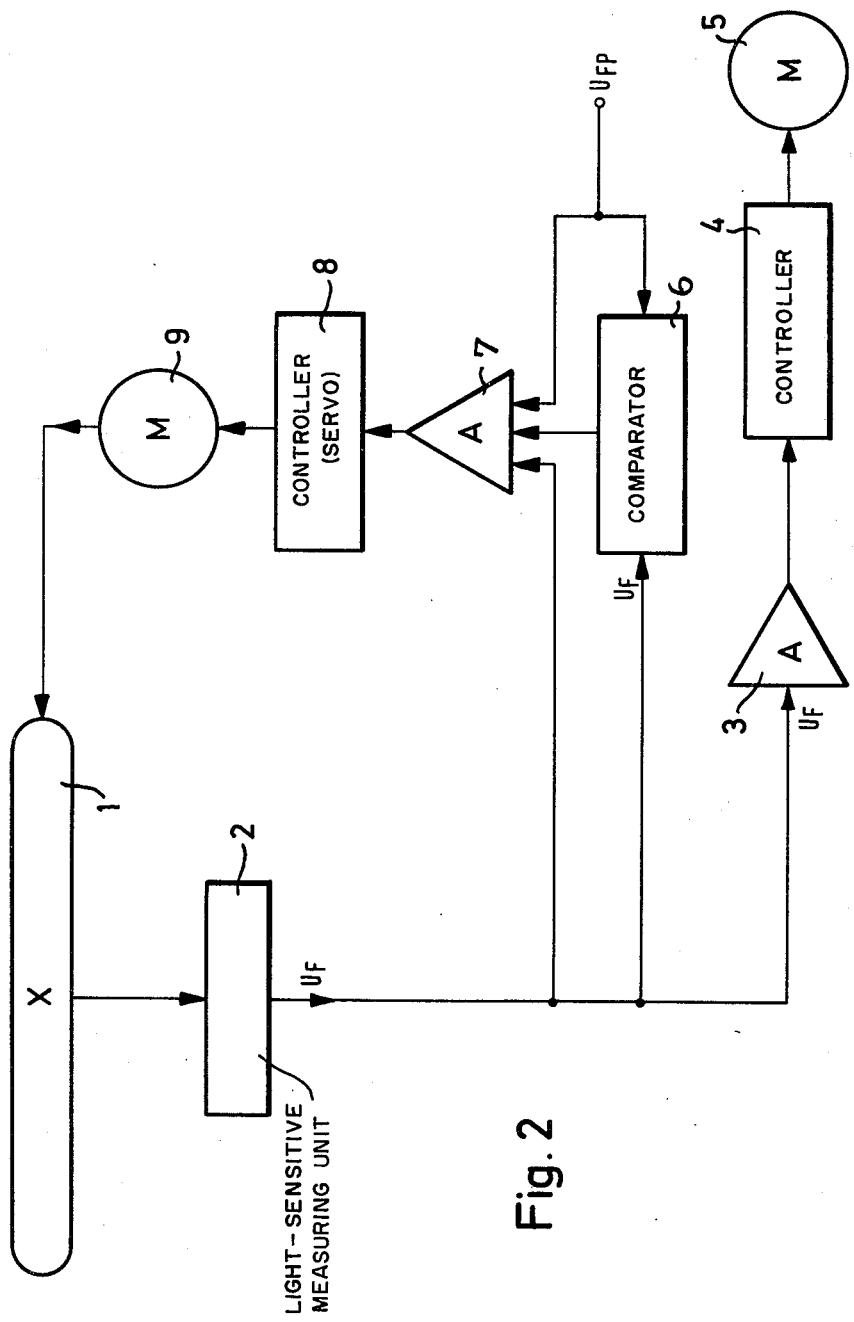
Figure 3:
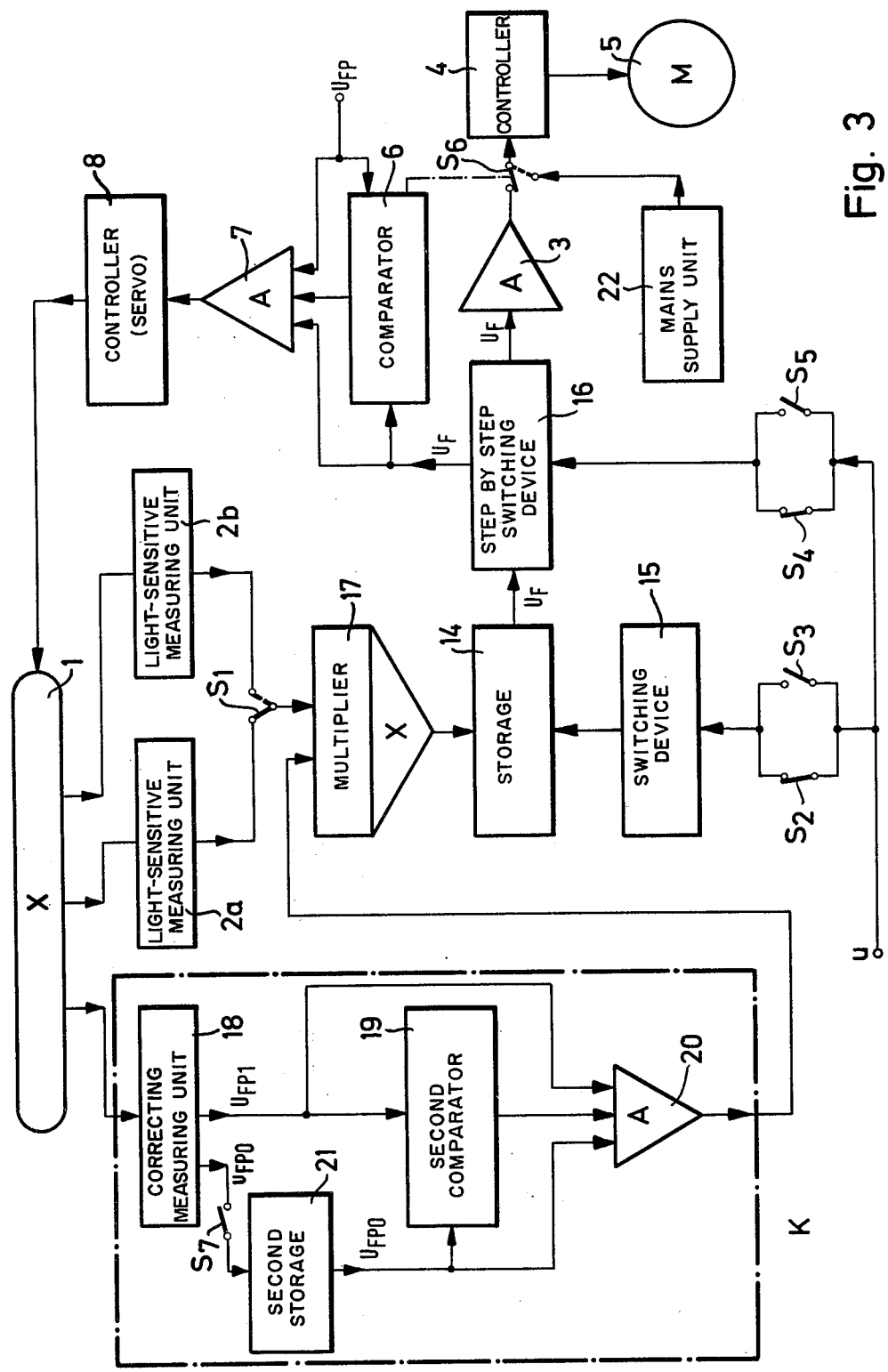

The invention will be further illustrated by reference to two exemplary embodiments and the accompanying drawings, in which:

FIG. 1 is a diagram showing the ideal speed of travel of the copying material correlated to the photoelectric voltage of a light-sensitive measuring instrument FIG. 2 is a block diagram of a first embodiment of the invention, FIG. 3 is a block diagram of a second embodiment of the invention, and FIG. 4 is a perspective view, partially in cross-section, of the exposure station.

In the following exemplary embodiments, the signal supplied from the light-sensitive measuring unit is proportional to the transparency of the original.

FIG. 1 shows a diagram in which the speed of travel V of the material to be copied is plotted in dependence upon the photoelectric voltage $U_F$ measured at the light-sensitive measuring unit. This diagram applies to a light-sensitive measuring unit supplying a photoelectric voltage $U_F$ which is greater with greater transparency of the original. $V_{max}$ stands for the highest speed of travel of the copying apparatus. The copying apparatus operates at this speed when the transparency of an original supplies the photoelectric voltage $U_{FP}$ at the light-sensitive measuring unit. As the diagram shows, control of the speed of travel V in dependence upon the transparency is possible only in the hatched field. When an original has a transparency supplying a photoelectric voltage above $U_{FP}$, e.g. $U_{F1}$, the necessary speed is $V_1$ which is above $V_{max}$. Since, however, the copying apparatus yields only the speed $V_{max}$ it is necessary, if correctly exposed copies are to be obtained, to control the illumination intensity of the light source, either by reducing the intensity or by reducing the diaphragm aperture. In the hatched field, operation is carried out with the maximum illumination intensity of the light source. Outside the hatched field, however, the illumination intensity is reduced at the maximum speed to an extent which is greater with a greater difference $\Delta U_F$ between the measured photoelectric voltage, e.g. $U_{F1}$, and the photoelectric voltage $U_{FP}$. $U_{FP0}$ in the diagram denotes the photoelectric voltage corresponding to the maximum intensity of the light source. $U_{FP0}$ is the photoelectric voltage measured at the light-sensitive measuring unit when no original is between the measuring unit and the light source and the latter is switched to the highest intensity.

FIG. 2 shows a simple embodiment of the apparatus of the invention. Numeral 1 denotes the copying light source from which a light beam is directed into the transport path of the original before it joins the copying material. The light beam passes through the original and impinges upon the light-sensitive measuring unit 2. Depending upon the transparency of the original, the measuring unit passes on a lower or higher photoelectric voltage as a signal via an amplifier 3 and a controller 4 for controlling the speed of the drive motor 5. The original and the copying material are then conveyed at the correct speed through the exposure station. The signal $U_F$ coming from the measuring unit 2 is simultaneously passed to a comparator 6. At the second input of the comparator 6, there is the predetermined voltage $U_{FP}$ which, according to FIG. 1, corresponds to the highest speed, i.e. to the highest speed of travel $V_{max}$. If the measured photoelectric voltage $U_F$ is above $U_{FP}$, the comparator 6 supplies an output signal to the reference amplifier 7, to which the predetermined voltage $U_{FP}$ is also applied. At the other input of the reference amplifier 7, there is the photoelectric voltage $U_F$ coming from the light-sensitive measuring unit. When a signal comes from the comparator 6, the reference amplifier 7 forms the difference $\Delta U_F$ between the signal $U_F$ corresponding to the transparency of the original and the predetermined signal $U_{FP}$. The reference amplifier 7 supplies, at its output, a signal which corresponds to this difference and which is passed on to the device 8 for changing the illumination intensity.

The device 8 is a controller which changes the position of the servomotor 9. In correspondence with the signal of the controller 8, the motor 9 adjusts a certain diaphragm aperture at the light source 1. This is diagrammatically shown in FIG. 4. The light source 1 is in the center of the copying cylinder 10. Numeral 11 denotes a fixed diaphragm. In the copying cylinder 10, there is also a second diaphragm 12 which is displaceable in the direction of the arrow B. The speed of the conveyor belt 13 conveying the original and the copying material around the copying cylinder 10 is determined by the speed of the drive motor 5 and thus by the signal $U_F$ coming from the light-sensitive measuring unit 2. When $U_F$ is above $U_{FP}$ a signal corresponding to the difference is passed from the reference amplifier 7 via the controller 8 to the servomotor 9, which displaces the movable diaphragm 12 through the angle $\alpha$. In this case, the conveyor belt 13 runs at the maximum speed and the illumination intensity is reduced by the diaphragm 12 displaced through the angle $\alpha$. It is apparent that the angle $\alpha$ is greater with a greater difference between $U_F$ and $U_{FP}$.

When $U_F$ is below $U_{FP}$ the comparator 6 passes no output signal to the reference amplifier 7 and the adjustment of the illumination intensity of the light source 1 thus is not changed. The diaphragm 12 has the position shown in FIG. 4, i.e. the angle $\alpha$ is zero. The conveyor belt 13 runs at the speed corresponding to the signal $U_F$ coming from the light-sensitive measuring unit 2 and passed on via the amplifier 3 and the controller 4 to the drive motor 5.

When $U_F$ and $U_{FP}$ are identical, the comparator 6 also supplies no output signal, i.e. the adjustment of the diaphragm 12 is not changed. The conveyor belt 13 then runs, in correspondence with the signal $U_{FP}$, at the maximum speed.

FIG. 3 shows a second embodiment of the invention. In this embodiment, it is possible to keep several kinds of copying material in the copying apparatus and to introduce the original, depending on its width, either on the left or the right hand side of the feed table into the apparatus. Therefore, the light-sensitive measuring unit 2a is provided for the originals introduced on the left hand side and the light-sensitive measuring unit 2b for the originals introduced on the right hand side. In FIG. 3, the left-hand light-sensitive measuring unit 2a is switched into the control signal circuit. When an original is introduced on the right hand side it actuates, on its way before the light-sensitive measuring units, an electric switch $S_1$ in the control signal circuit, which is then applied to the other contact (see dotted line in FIG. 3) and thereby switches the light-sensitve measuring unit 2b into the control signal circuit.

This embodiment further provides a storage 14 containing several capacitors so that the signals of several originals can be stored simultaneously. Furthermore, a step-by-step switching device 15 is provided by means of which the signals contained in the storage 14 can be interrogated successively and, after the particular original has passed the exposure station, are erased again. The transparency of an original introduced into the apparatus is measured by the light-sensitive measuring unit 2a or 2b and stored in one of the capacitors of the storage 14. This is performed in that the original, depending upon whether it is introduced on the right or left hand side, actuates one of the electric switches $S_2$ and $S_3$ in the control signal circuit and thus triggers a short pulse. The step-by-step switching device 15 is switched thereby and one of the capacitors is connected with one of the light-sensitive measuring units for storing the signal $U_F$ of the particular original.

Shortly before that original is introduced into the exposure station, and depending on whether it has been introduced on the right or left hand side, it actuates one of the electric switches $S_4$ and $S_5$ in the control signal circuit. This triggers a short-time pulse which actuates the step-by-step switching device 16, whereby the signal of the original is interrogated from the storage 14 and passed on via the amplifier 3 and the controller 4 for speed control of the driving motor 5. Simultaneously, the signal of the preceding original is erased by means of the step-by-step switching device 16. While the original is in the exposure station it is already possible to introduce the next one and the just described procedure is repeated.

Such devices in which several signals can be stored simultaneously and interrogated upon request are known from German Offenlegungsschriften Nos. 2,119,373 and 2,204,336.

Control of the illumination intensity of the light source 1 is the same in this embodiment as described above with respect to FIG. 2. But in the embodiment according to FIG. 3, when the measured signal $U_F$ is above the predetermined voltage $U_{FP}$, the diaphragm aperture is not changed but a voltage correspondingly reduced via the controller 8 is applied to the light source 1 so that the latter is weakened in its intensity. Furthermore, when $U_F$ and $U_{FP}$ are identical, the switch $S_6$ is actuated so that the voltage of the mains supply unit 22 is applied to the controller 4 and the drive motor 5 runs at the maximum speed as in the first exemplary embodiment.

Since in this exemplary embodiment, the light intensity of the light source 1 is reduced when it is required by the transparency of an original and the light of this light source 1 is used for transparency measurement, it must be ensured that the changing light intensity of the light source 1 does not lead to invalid results in the transparency measurement. Since the copying apparatus in this embodiment is a high-speed apparatus in which the originals can be introduced directly one after the other — the storage 14 and the step-by-step switching devices 15 and 16 being arranged for this purpose — there is provided a correcting device K described in the following.

If the transparency of an original does not exceed the value supplied by the photoelectric voltage $U_{FP}$, i.e. as long as the speed control of the drive motor 5 is sufficient to obtain correctly exposed copies, the light source 1 radiates with maximum intensity. Consequently, the transparency of the succeeding originals is measured with that light not reduced in its intensity. When an original has a higher transparency which supplies a photoelectric voltage $U_F$ above $U_{FP}$, the intensity of the light source 1, as described above, is reduced by means of the reference amplifier 7 and the controller 8, while that original runs through the exposure station. When, during that time, the next original is introduced, its transparency is measured at one of the light-sensitive measuring units 2a and 2b with light of a lower intensity. To correct this value to the value which would be achieved with the maximum light intensity, the signal coming from the light-sensitive measuring unit 2a or 2b is passed to the input of the multiplier 17. Furthermore, there is provided a light-sensitive correcting measuring unit 18 which is arranged at a place in the ray path of the light source 1 which is not covered during the copying procedure by the material to be copied. This correcting measuring unit 18 measures the particular intensity of the light source 1 and passes a corresponding signal to a second comparator 19. This comparator compares the signal with a predetermined signal $U_{FP0}$ corresponding to the maximum intensity of the light source 1. Only when the signals deviate from one another the comparator 19 passes on a signal to a second reference amplifier 20 to which the predetermined voltage $U_{FP0}$ and the photoelectric voltage $U_{FP1}$ measured at the correcting measuring unit 18 are also applied. When the comparator 19 supplies an output signal the reference amplifier 20 forms the difference between both signals and supplies a signal corresponding to this difference to the multiplier 17 which increases the signal coming from the light-sensitive measuring unit 2a or 2b by the difference signal. The multiplier 17 then passes a signal to the storage 14 which corresponds to the transparency of the original measured with the light source 1 radiating with maximum intensity. When the comparator 19 determines no difference and when thus no signal comes to the reference amplifier 20, the multiplier 17 passes the signal coming from one of the light-sensitive measuring units 2a and 2b to the storage 14 without any change.

Since the maximum intensity of the light source 1 may be changed by aging, a second storage 21 is provided as the calibrating unit. After each switching on of the copying apparatus prior to the first copying procedure, the switch $S_7$ is closed for a short time and the signal of the maximum intensity is thereby stored in the second storage 21. The storage 21 then steadily supplies the signal $U_{FP0}$ to the comparator 19 and to the reference amplifier 20.

It will be obvious to those skilled in the art that many modifications may be made within the scope of the present invention without departing from the spirit thereof, and the invention includes all such modifications.

What is claimed is:

1. A process for automatically changing the illumination intensity of a light source in a copying apparatus in which the transparency of the original is measured with at least one light-sensitive measuring unit and in which, based on the measured transparency, a signal is passed on from this measuring unit for controlling the speed of a drive motor, comprising comparing the signal coming from the light-sensitive measuring unit and passed on for controlling the speed of the drive motor with a predetermined signal corresponding to the highest speed of the drive motor and, if the measured signal requires a higher speed than that of the predetermined signal, the difference of the two signals is formed and the illumination intensity is controlled in correspondence with this difference signal.

2. An apparatus for automatically changing the illumination intensity of a light source in a copying apparatus with at least one light-sensitive measuring unit for measuring the transparency of the original and a device for controlling the speed of a drive motor by the signal coming from the measuring unit, comprising
   a. a comparator means which compares the signal coming from the light-sensitive measuring unit with a predetermined input voltage corresponding to the highest speed and, if the signal requires a higher speed, supplies an output signal,
   b. a reference amplifier means acting as a difference former to which the same predetermined input voltage is applied, which is connected with the output of the comparator means and which, if the comparator means supplies an output signal, supplies an output voltage itself which is proportional to the difference of the signal coming from the light-sensitive measuring unit and the predetermined input voltage, and
   c. means connected to the output of the reference amplifier for changing the illumination intensity in correspondence with the output voltage of the reference amplifier means.

3. An apparatus according to claim 2 in which the device for changing the illumination intensity is a controller means the output voltage of which is applied to the light source.

4. An apparatus according to claim 2 in which the device for changing the illumination intensity is a controller means which controls a servomotor for changing a diaphragm aperture.

5. An apparatus according to claim 2 including
a. a light-sensitive correcting measuring unit means for measuring the intensity of the light source, said measuring unit being arranged in a ray path of the light source which is not covered by the material to be copied during the copying procedure,
b. a second comparator means which compares the signal coming from the correcting measuring unit means with a predetermined input voltage corresponding to the maximum intensity of the light source and, if the signals are not identical, supplies an output signal,
c. a second difference former means to which the same predetermined input voltage is applied, which is connected with the output of the second comparator means, and which, if the second comparator means supplies an output signal, supplies an output voltage itself which is proportional to the difference of the signal coming from the correcting measuring unit means and the predetermined voltage, and
d. a second means connected with the output of the second difference former means, which second means increases the signal coming from the light-sensitive measuring unit for measuring the transparency of the original in correspondence with the output voltage of the second difference former means.

6. An apparatus according to claim 5 including switch means connecting the light-sensitive correcting measuring unit to a storage means for storing the signal of the maximum intensity of the light source as the predetermined input voltage for the second comparator means and the second difference former means.

* * * * *